(12) United States Patent
Sheaffer

(10) Patent No.: US 6,944,750 B1
(45) Date of Patent: Sep. 13, 2005

(54) PRE-STEERING REGISTER RENAMED INSTRUCTIONS TO EXECUTION UNIT ASSOCIATED LOCATIONS IN INSTRUCTION CACHE

(75) Inventor: Gad S. Sheaffer, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/540,432

(22) Filed: Mar. 31, 2000

(51) Int. Cl.$^7$ .............................................. G06F 9/38
(52) U.S. Cl. ...................... 712/215; 711/129; 712/216
(58) Field of Search ........................ 711/129; 712/215, 712/216

(56) References Cited

U.S. PATENT DOCUMENTS

| | | | | |
|---|---|---|---|---|
| 5,442,760 A | * | 8/1995 | Rustad et al. ............... | 712/215 |
| 5,471,593 A | * | 11/1995 | Branigin ..................... | 712/235 |
| 5,790,822 A | | 8/1998 | Sheaffer et al. ............. | 395/380 |
| 5,978,899 A | * | 11/1999 | Ginosar et al. ............. | 712/210 |
| 6,219,780 B1 | * | 4/2001 | Lipasti ....................... | 712/215 |
| 6,351,802 B1 | * | 2/2002 | Sheaffer ..................... | 712/215 |
| 6,519,683 B2 | * | 2/2003 | Samra et al. ............... | 711/125 |

* cited by examiner

Primary Examiner—Kenneth S. Kim
(74) Attorney, Agent, or Firm—Kenyon & Kenyon

(57) ABSTRACT

The present invention is directed to a system and method for implementing a pre-steered instruction cache. The hardware logic that normally steers instructions to specific execution units just prior to execution is moved before the pre-steered instruction cache, so that instructions are pre-steered into that cache. In other words, the instructions can be moved into the instruction cache in such a manner that they are organized in the cache depending on the execution unit(s) to which they will be transmitted. This is done so that an instruction can leave the pre-steered instruction cache and enter the execution unit that can execute it with either minimum or no steering logic involvement. The cache lines of the pre-steered instruction cache are organized into bins such that each bin corresponds to either a single execution unit or a cluster of execution units.

31 Claims, 9 Drawing Sheets

PRE-STEERING REGISTER RENAMED INSTRUCTIONS TO EXECUTION UNIT ASSOCIATED LOCATIONS IN INSTRUCTION CACHE

BACKGROUND OF THE INVENTION

I. Field of the Invention

This invention relates generally to computer technology, and more particularly, to improving processor performance in a computer system.

II. Background Information

Modern processors implement a variety of techniques to increase the performance of executing instructions, including superscalar, pipelining, and out-of-order instruction execution. More specifically, superscalar processors are capable of processing multiple instructions within a common clock cycle. Pipelined processors divide the processing (from fetch to retirement) of an operation into separate pipestages and overlap the pipestage processing of subsequent instructions in an attempt to achieve single pipestage throughput performance. Out-of-order processing within a processor involves allowing instructions without true data dependencies to be processed out of their original program order to gain performance and increase parallelism and efficient resource usage.

The following two types of hazards may cause pipeline stalls: a structural hazard and a data hazard. Structural hazard arises from resource conflicts (e.g., execution unit conflicts) when the hardware cannot support all possible combinations of instructions in simultaneous overlapped execution. Data hazard arises when an instruction depends on the results of a previous instruction in a way that is exposed by the overlapping of instructions in the pipeline.

Instruction steering is the process of sending an instruction to the execution unit that it requires. Steering the instructions in the pipestages between the instruction cache and the execution unit, however, unnecessarily couples the execution throughput to the throughput at which the steering can be performed.

If, however, the steering is done prior to the instruction cache, the manipulations could be performed at a slower throughput because the throughput of fetching an instruction from main memory to the instruction cache is much slower than the throughput of instructions executing in the pipeline (typically, the pipeline is executing multiple instructions every clock cycle). Therefore, if the steering is done prior to the instruction cache, it could be performed concurrently with the instruction fetch from main memory and thus the steering could be performed at the slower rate without appreciably degrading the overall system performance.

If instruction steering is done prior to the instruction cache, the steering could be captured in the instruction cache, and therefore, the instruction steering would only have to be repeated in the case of an instruction cache miss. If, however, the steering is done in the pipestages, then the steering would have to be done for all dynamic instances of the instruction. Dynamic instances of an instruction is the number of times that an instruction at a specific address was executed. Static instances of an instruction is the number of instructions in a code segment, where each instruction (at each address) is counted only once. For example, in a program loop (e.g., a "for" loop) that performs a multiply instruction one thousand times, the dynamic instances of the instruction is one thousand but the static instance of the instruction is one. Performing the instruction steering prior to the instruction cache results in performing the steering at a reduced throughput because fewer instructions would be manipulated per processor cycle. The efforts of the steering can be used multiple times, thereby reducing the total number of steering operations performed during the processing of instructions. Any increase in time to perform the steering prior to the instruction cache (as discussed in the prior paragraph) can be amortized over multiple executions.

Typically, instructions are steered as quickly as possible to the execution unit that the instruction requires without consideration of other instructions. Steering the instructions prior to the instruction cache, however, allows for more optimal steering because the steering can be performed on a window of instructions. The start of the steering activity may be deferred until a given number of instructions have been accumulated in the instruction window. Using the instruction window increases the quality of the steering because a larger number of instructions are taken into account when a particular instruction is steered.

The more aggressive the implementation of a superscalar, out of order, and pipelined processor, the more manipulations that have to be applied to each instruction as they are passed down the pipestages of the processor. Two of the most complex manipulations performed in a pipelined processor involve register renaming and scheduling. Register renaming is the process of assigning new registers for new values produced in order to remove false data dependencies (dependencies caused by the reuse of storage locations even though the conflicting instructions are otherwise independent). Scheduling involves rearranging the instructions to avoid pipeline stalls (i.e., overcome structural and data hazards). Performing the complex manipulations and steering the instructions prior to the instruction cache may allow instructions to be transferred directly from the instruction cache to the execution unit that the instruction requires without further steering in the pipestages.

A crossbar is a switch that may provide a path between devices and also may steer the instructions. For example, a crossbar may provide paths between a reservation station and multiple execution units and steer instructions to the proper execution unit. The number of wires needed in a crossbar is proportional to the number of execution units multiplied by the number of instructions being steered per cycle. As the size of the crossbar increases, the resistance and capacitance in the crossbar also increases resulting in timing delays which decrease the rate at which the instructions are steered. As the size of the crossbar decreases, the rate at which the instructions are steered increases. If the instructions are steered prior to the instruction cache, the crossbar between the instruction cache and the execution units may be eliminated or its size significantly reduced thus resulting in, among other things, a quicker rate at which instructions are steered.

For the foregoing reasons, there is a need for an instruction cache that supports pre-steered instructions.

DETAILED DESCRIPTION

The present invention pertains to an instruction cache which is adapted to handle pre-steered instructions. The hardware logic that normally steers instructions to specific execution units just prior to execution is moved before the instruction cache, so that instructions are pre-steered into the instruction cache. This is done so that an instruction can leave the instruction cache and enter the execution unit that can execute it with either minimum or no steering logic involvement. The cache lines of a pre-steered instruction cache may be organized into bins such that each bin corresponds to either a single execution unit or a cluster of execution units.

For example, a floating point multiply instruction comes out of the pre-steered instruction cache in the position serviced by an execution unit performing floating point multiplication. Steering instructions prior to inserting them into the instruction cache minimizes delays at the point where the pipe has its highest throughput by performing the steering prior to the instruction cache that is running at a lower throughput (as explained below).

Steering the instructions prior to the instruction cache allows the steering to be performed at a slower throughput because the throughput of fetching an instruction from main memory to the instruction cache is much slower than the throughput of instructions executing in the pipeline (typically, the pipeline is executing multiple instructions every clock cycle while fetching multiple instructions simultaneously from main memory takes several clock cycles). Steering the instructions prior to the instruction cache also allows the steering information for a particular instruction to be captured in the instruction cache, and thus, that steering information for the instruction may be used many times. This significantly improves processor performance because the cost for steering the instruction may be amortized over a large number of instructions thus reducing the overall cost of steering any particular instance of the instruction.

Pre-steering the instructions prior to the instruction cache may also reduce the size of or completely eliminate the crossbar between the instruction cache and the execution units. The reduction in size of the crossbar results in an improvement in the rate that the instructions are steered.

Steering the instructions prior to the instruction cache allows for optimal steering because an instruction window can be used to consider other instructions when performing the steering operation.

Performing complex manipulations on instructions, such as scheduling, and steering those instructions prior to the instruction cache may allow those instructions to be transferred directly from the instruction cache to the particular execution unit that each of the instructions requires.

Figure 1:
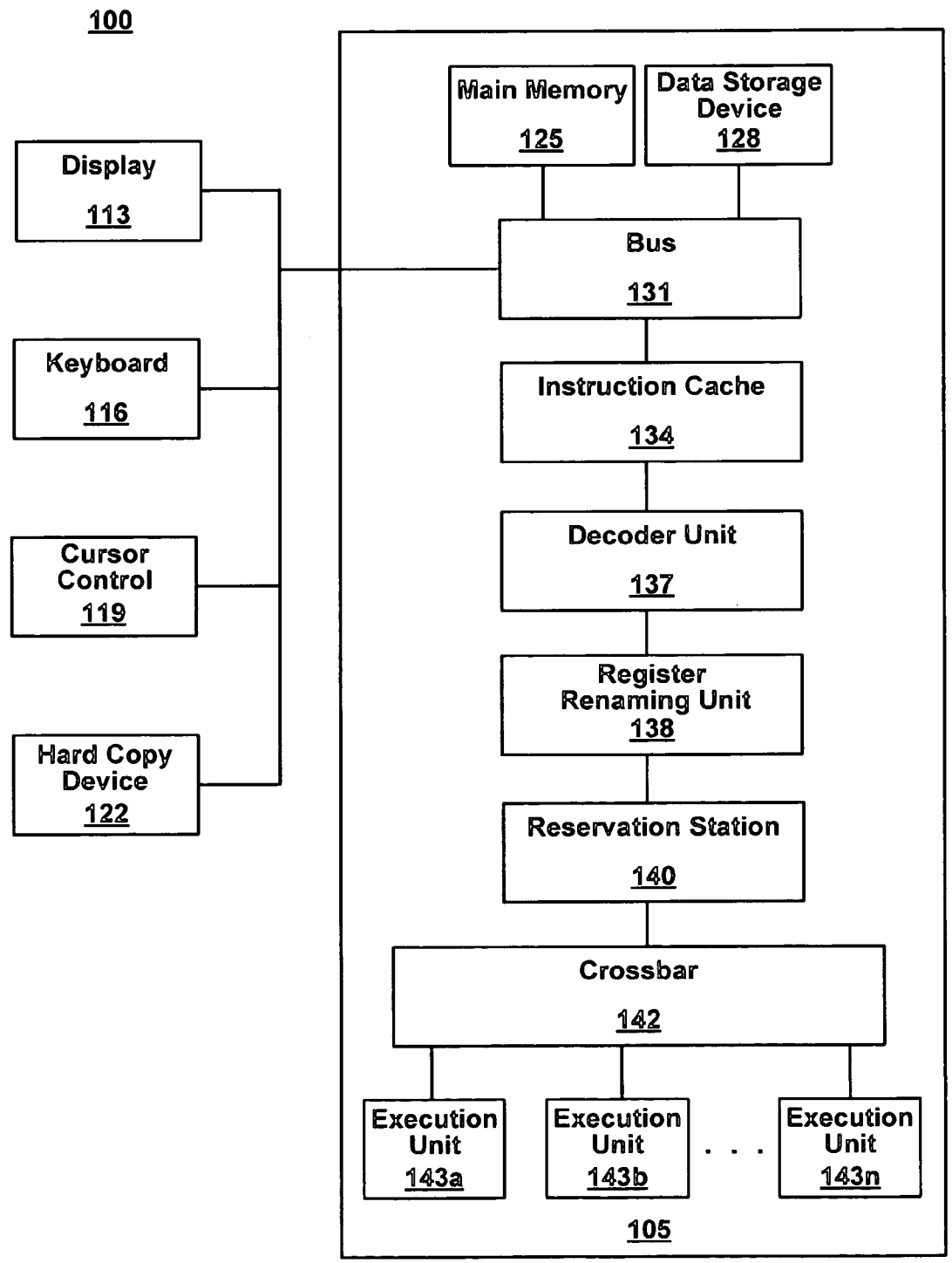
FIG. 1 shows a block diagram of a typical implementation of a computer system.

FIG. 1 shows a block diagram of a typical implementation of a computer system 100. Computer system 100 includes a bus 131 for communicating information between the components of computer system 100, and a processor 105 for executing instructions and processing information. Computer system 100 further includes a main memory 125 coupled to bus 131 for dynamically storing information and instructions to be executed by processor 105. Main memory 125 also may be used for storing temporary variables or other intermediate information during execution of instructions by processor 112. Computer system 100 may also include a data storage device 128 coupled to bus 131 for statically storing data. Data storage device 128 may be a magnetic disk or optical disk and its corresponding disk drive.

Computer system 100 may further be coupled to a display device 113, such as a cathode ray tube (CRT) or liquid crystal display (LCD) coupled to bus 131 for displaying information to a user of computer system 100. A keyboard 116 may also be coupled to bus 131 for communicating information and command selections to processor 105. A cursor control 119 is an additional user input device such as a mouse, a trackball, stylus, or cursor direction keys. Cursor control 119 is coupled to bus 131 for communicating direction information and command selections to processor 112, and for controlling cursor movement on display 113. Another device which may be coupled to bus 131 is a hard copy device 122 which may be used for printing instructions, data, or other information on a medium such as paper or film.

FIG. 1 also includes the units of processor 105 which are executed in a pipelined process. Instructions are initially fetched from one of the memory devices (e.g., main memory 125) into an instruction cache 134. Instruction cache 134 is a high-speed cache memory for storing commonly or recently accessed instructions. A decoder unit 137 may be coupled to instruction cache 134. Decoder unit 137 decodes each instruction into a set of micro-operations (uops). A register renaming unit 138 may be coupled to decoder unit 137. Register renaming unit 138 renames the instruction's architectural registers to logical registers. By renaming the registers used by the instructions to a larger set of logical registers, false data dependencies between instructions may be removed allowing additional parallel execution of instructions.

A reservation station 140 may be coupled to register renaming unit 138. Reservation station 140 schedules instructions (removes data and structural hazards) and controls when an instruction can begin executing. A crossbar 142 may be coupled to reservation station 140. Crossbar 142 is the wires and logic that provide a path between devices and also steers instructions. In this case, crossbar 142 provides a path between reservation station 140 and execution units 143a–n (the last execution unit is designated execution unit 143n). Execution units 143a–n execute logical and arithmetic instructions as well as other well known execution functions. Execution units 143a–n may include an integer execution unit, a floating point unit, and a memory execution unit.

Figure 2:
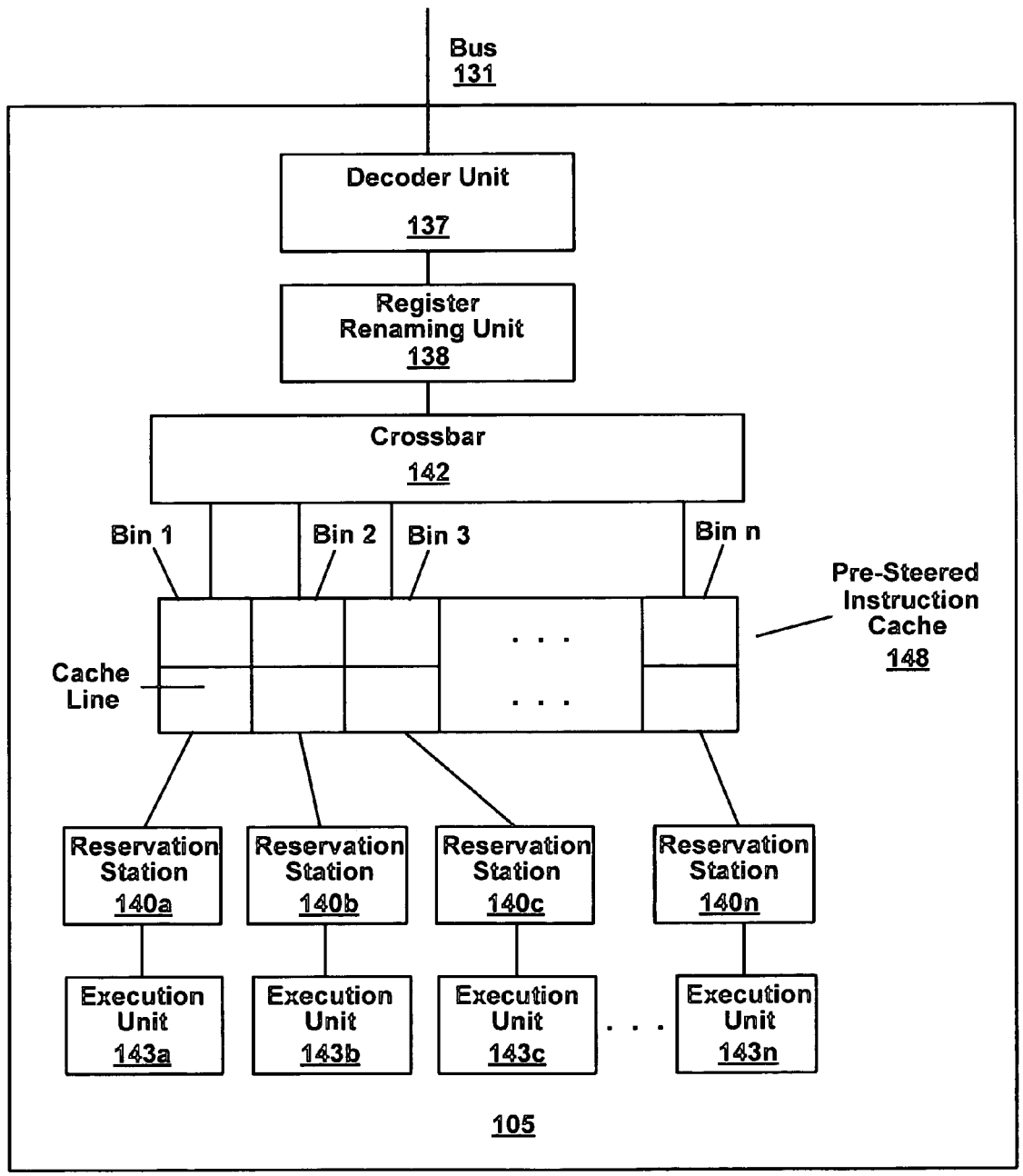
FIG. 2 shows a block diagram of a processor according to a first embodiment of the present invention.

FIG. 2 shows a block diagram of processor 105 according to a first embodiment of the present invention. In this embodiment, a pre-steered instruction cache 148 has its cache lines (or cache blocks) organized into multiple bins, each of the bins corresponding to a different execution unit. For example, in FIG. 2, bin 1 of pre-steered instruction cache 148 corresponds to an execution unit 143a, bin 2 corresponds to an execution unit 143b, bin 3 corresponds to an execution unit 143c, and the last bin, designated as bin n, corresponds to a last execution unit available in processor 105, designated as execution unit 143*n*. In this embodiment, the instructions are steered by crossbar 142 prior to being stored in pre-steered instruction cache 148, however, the instructions are not scheduled prior to being stored in pre-steered instruction cache 148.

In this embodiment, instructions are initially fetched from one of the memory devices into decoder unit 137 which decodes the instructions. The instruction are then sent to register renaming unit 138 which renames the registers used by a particular instruction to a larger set of physical registers in order remove false data dependencies. The instructions are then sent to crossbar 142 which steers the instructions into an appropriate bin within pre-steered instruction cache 148. Each of the instructions are inserted into a bin within pre-steered instruction cache 148 that corresponds to the execution unit required by that particular instruction.

Each of the bins has a corresponding reservation station associated with it. The instructions are then moved from a particular bin to the corresponding reservation station. In FIG. 2, bin 1 corresponds to reservation station 140*a*, bin 2 corresponds to reservation station 140*b*, bin 3 corresponds to reservation station 140*c*, and the last bin, designated as bin n, corresponds to the last reservation station, designated as reservation station 140*n*. The reservation station schedules the instructions and sends each of the instructions to the corresponding execution unit (each of the reservation stations has a corresponding execution unit). In FIG. 2, reservation station 140*a* corresponds to execution unit 143*a*, reservation station 140*b* corresponds to execution unit 143*b*, reservation station 140*c* corresponds to execution unit 143*c*, and reservation station 140*n* corresponds to a last execution unit, designated as execution unit 143*n*. In this embodiment, because the instructions are already steered prior to reaching pre-steered instruction cache 134, and each of the bins corresponds to an individual execution unit, the crossbar is eliminated between pre-steered instruction cache 148 and execution units 143*a*–143*n*.

Figure 3:
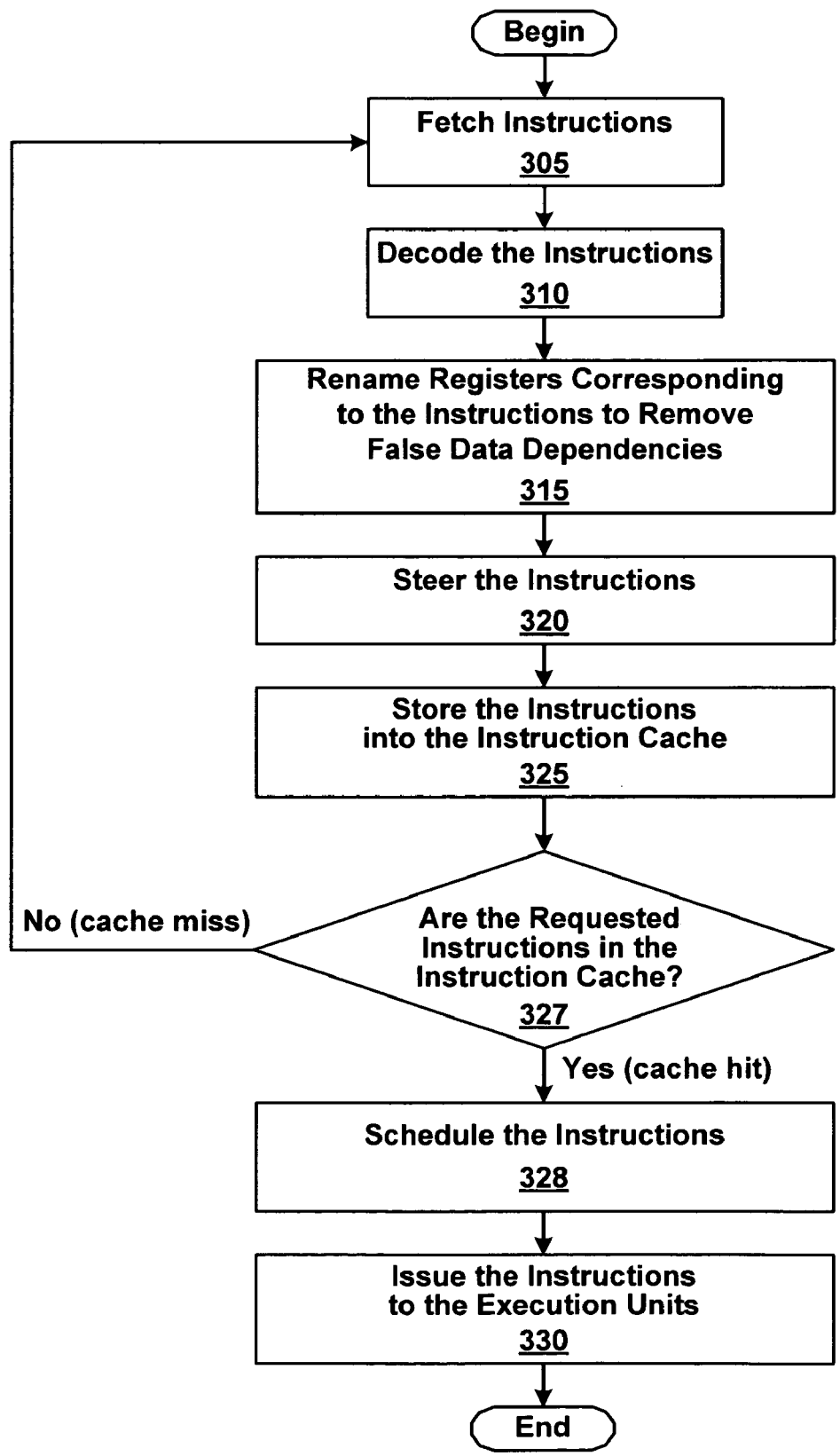
FIG. 3 shows a flowchart describing the process of executing instructions according to the first embodiment of the present invention.

FIG. 3 shows a flowchart describing the process of executing instructions according to the first embodiment of the present invention. In step 305, instructions are fetched from a memory device (e.g., main memory 125) and sent to decoder unit 137. In step 310, decoder unit 137 decodes each of the instructions to, for example, determine which execution unit the particular instruction requires. The instructions are then transferred to register renaming unit 138. In step 315, register renaming unit 138 renames the registers of a particular instruction to remove false data dependencies. The instructions are then sent to crossbar 142. In step 320, crossbar 142 steers each of the instructions into one of the bins in pre-steered instruction cache 148 corresponding to the execution unit that the particular instruction requires. In step 325, the instructions are stored in pre-steered instruction cache 148. Each of the instructions are stored into the appropriate bin of pre-steered instruction cache 148, i.e., stored into the bin corresponding to the execution unit that the instruction requires. In step 327, processor 105 determines if the instructions requested by the processor are in pre-steered instruction cache 148. If the requested instructions are not in pre-steered instruction cache 148 (i.e., a cache miss occurred), then control returns to step 305 in order to fetch the requested instructions not in pre-steered instruction cache 148 from one of the memory devices. If the requested instructions are in pre-steered instruction cache 148, then those instructions are fetched from pre-steered instruction cache 148 and sent to the corresponding reservation stations. In step 328, the corresponding reservation stations schedule the instructions. In step 330, the corresponding reservation stations issue each of the instructions to the appropriate execution unit that the particular instruction requires.

Figure 4:
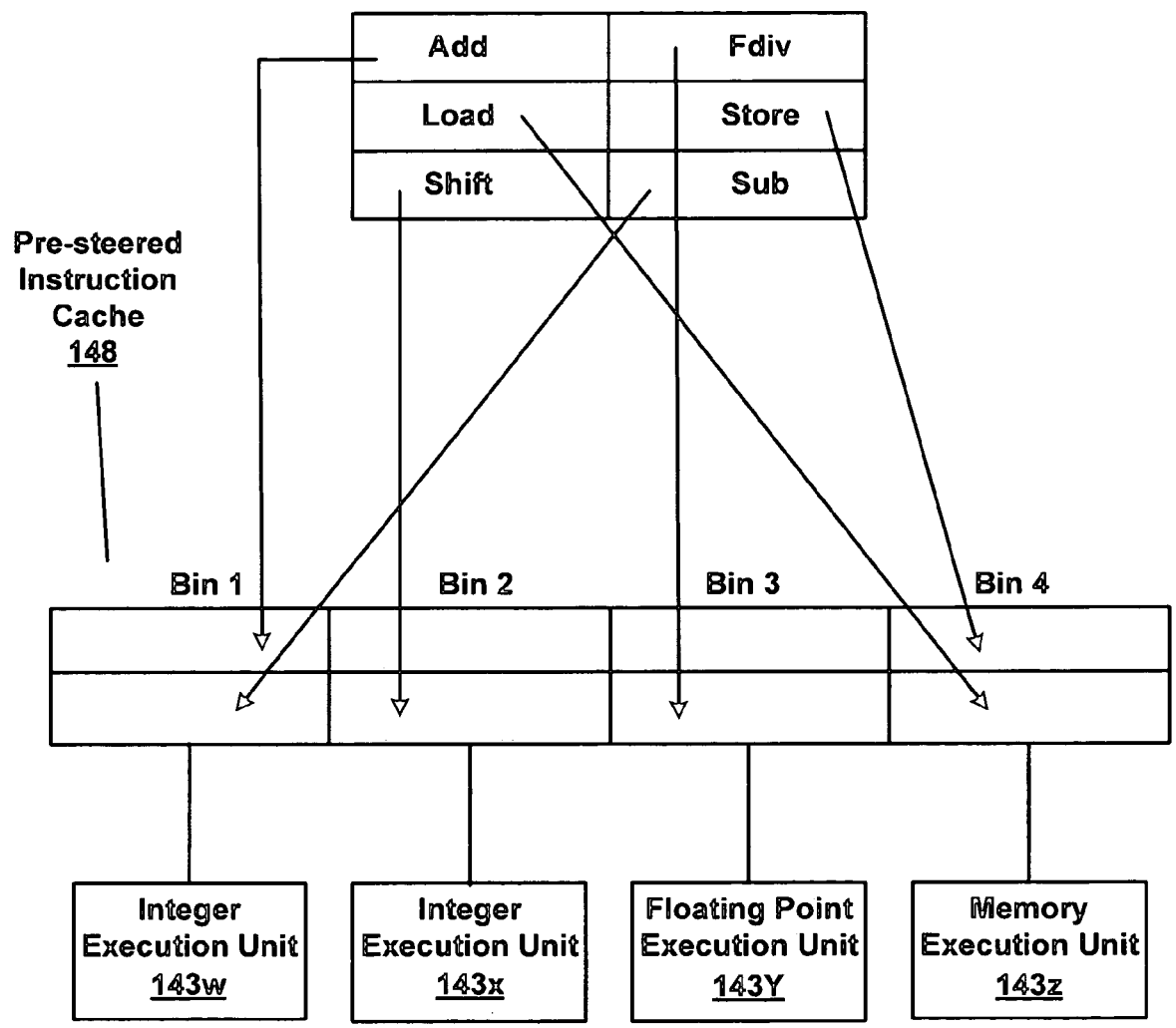
FIG. 4 illustrates the instruction steering activity in the first embodiment of the present invention.

FIG. 4 illustrates the instruction steering activity in the first embodiment of the present invention. In FIG. 4, bin 1 of pre-steered instruction cache 148 corresponds to an integer execution unit 143*w*. Bin 2 corresponds to an integer execution unit 143*x*. Bin 3 corresponds to a floating point execution unit 143*y*. Bin 4 corresponds to a memory execution unit 143*z*. The "shift" instruction which uses an integer execution unit is steered to bin 2 which corresponds to an integer execution unit, specifically integer execution unit 143*x*. The "sub" instruction also uses an integer execution unit and for load balancing purposes is steered to bin 1 which corresponds to the integer execution unit currently not in use, i.e., integer execution unit 143*w*. The "load" instruction uses a memory execution unit and thus is steered to bin 4 which corresponds to a memory execution unit 143*z*. The "store" instruction also requires a memory execution unit and thus is steered to bin 4 which corresponds to memory execution unit 143*z*. The "add" instruction uses an integer execution unit and thus is steered to bin 1 which corresponds to integer, execution unit 143*w* (the "add" instruction could also have been steered to bin 2). The "fdiv" instruction uses a floating point execution unit and thus is steered to bin 3 which corresponds to the only floating point execution unit available in this example, i.e., floating point execution unit 143*y*. If these instructions are scheduled prior to pre-steered instruction cache 148, then they can be issued directly to the execution unit that corresponds to a particular bin.

Figure 5:
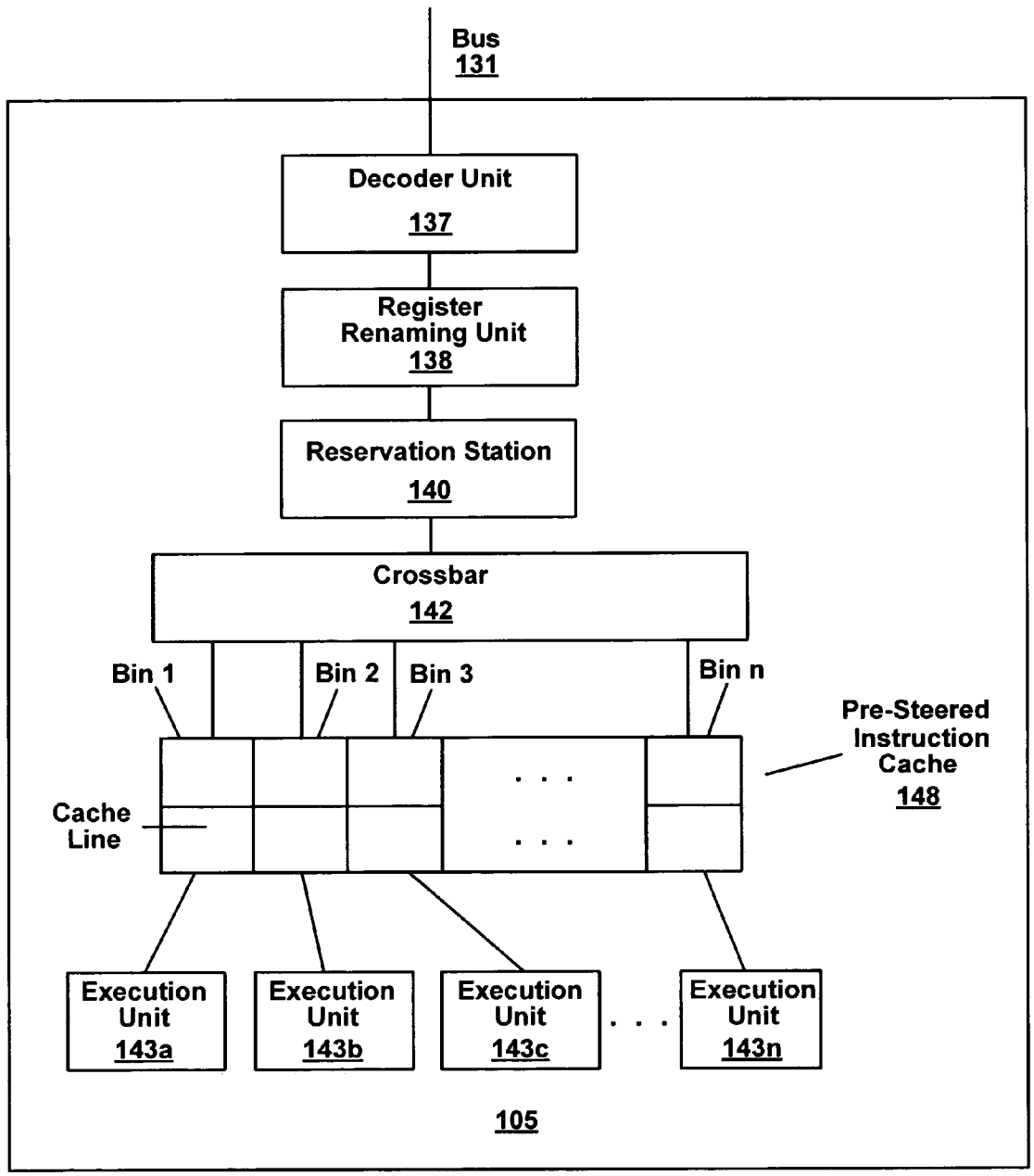
FIG. 5 shows a block diagram of the processor according to a second embodiment of the present invention.

FIG. 5 shows a block diagram of processor 105 according to a second embodiment of the present invention. In this embodiment, the instructions are steered by crossbar 142 and scheduled by reservation station 140 prior to being stored in pre-steered instruction cache 148. Pre-steered instruction cache 148 has its cache lines organized into multiple bins, each of the bins corresponding to a different execution unit.

In this embodiment, instructions are initially fetched from one of the memory devices into decoder unit 137 which decodes the instructions. The instruction are then sent to register renaming unit 138 which renames the registers to remove false data dependencies. The instructions are then transferred to reservation station 140 which schedules the instructions in order to eliminate data and structural hazards. The instructions are then sent to crossbar 142 which steers the instructions into an appropriate bin within pre-steered instruction cache 148. Each of the instructions are inserted into a bin within pre-steered instruction cache 148 that corresponds to the execution unit required by that particular instruction.

In this embodiment, because the instructions stored in pre-steered instruction cache 148 are already steered and scheduled, each of the instructions can move from a particular bin of pre-steered instruction cache 148 directly to the execution unit that the particular instruction requires. Because the instructions are already steered and scheduled prior to reaching pre-steered instruction cache 148, and each of the bins corresponds to an execution unit, the reservation stations and a crossbar between pre-steered instruction cache 148 and execution units 143*a*–143*n* are eliminated.

Figure 6:
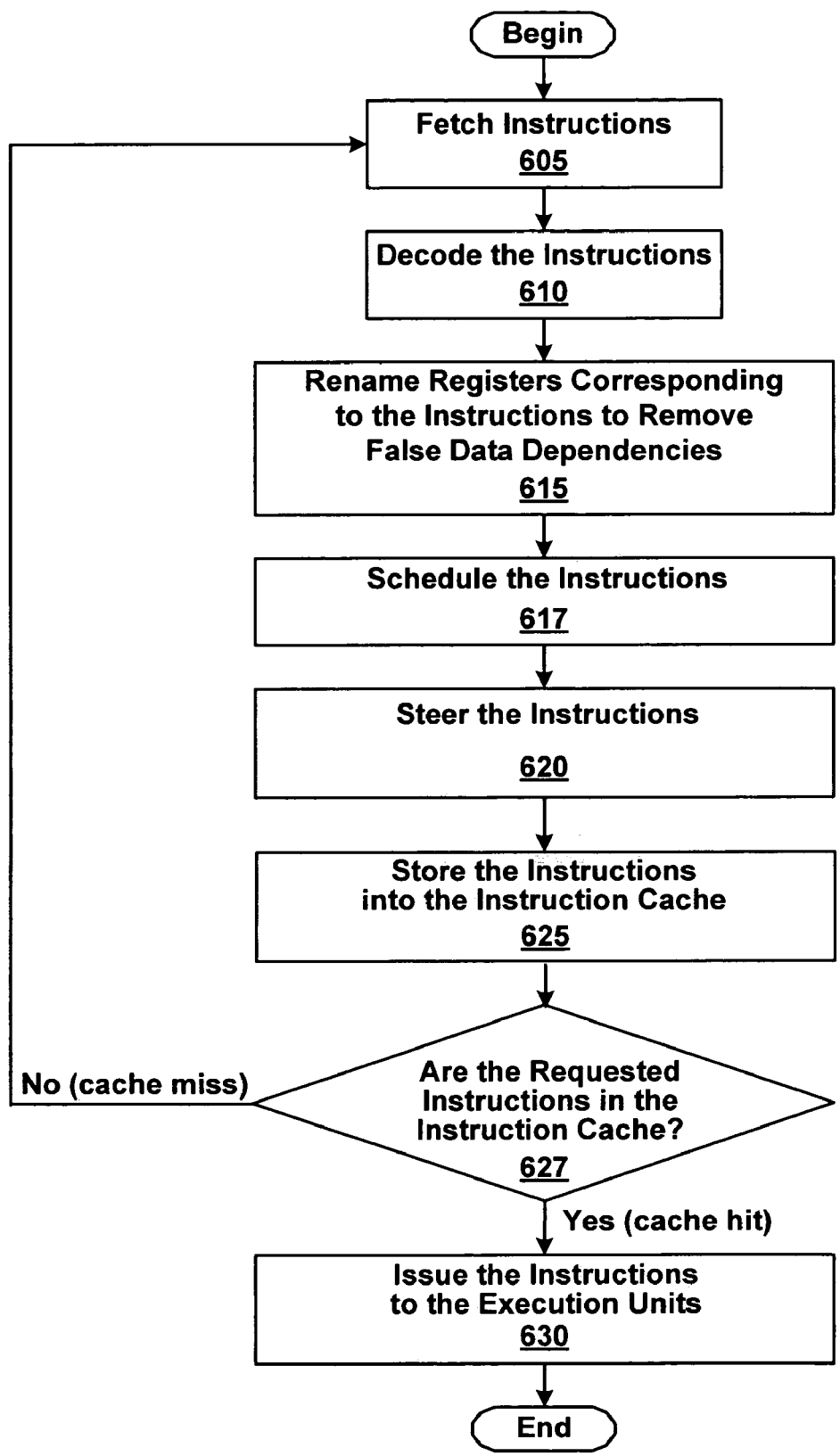
FIG. 6 shows a flowchart describing the process of executing instructions according to the second embodiment of the present invention.

FIG. 6 shows a flowchart describing the process of executing instructions according to the second embodiment of the present invention. In step 605, instructions are fetched from a memory device (e.g., main memory 125) and sent to decoder unit 137. In step 610, decoder unit 137 decodes the instructions. The instructions are then transferred to register renaming unit 138. In step 615, register renaming unit 138 renames the registers of a particular instruction to remove false data dependencies. The instructions are then sent to reservation unit 140. In step 617, reservation station 140 schedules the instructions to remove data and structural hazards. The instructions are then sent to crossbar 142. In step 620, crossbar 142 steers each of the instructions into one of the bins in pre-steered instruction cache 148 corresponding to the execution unit that the particular instruction requires. In step 625, the instructions are stored in pre-steered instruction cache 148. Each of the instructions are stored into the appropriate bin of pre-steered instruction cache 148, i.e., stored into the bin corresponding to the execution unit that the instruction requires. In step 627, processor 105 determines if the instructions requested by the processor are in pre-steered instruction cache 148. If the requested instructions are not in pre-steered instruction cache 148 (i.e., a cache miss occurred), then control returns to step 605 in order to fetch the requested instructions not in pre-steered instruction cache 148 from one of the memory devices. If the requested instructions are in pre-steered instruction cache 148, then each of those instructions are fetched from pre-steered instruction cache 148, and in step 630, issued directly to the execution unit that the particular instruction requires.

Figure 7:
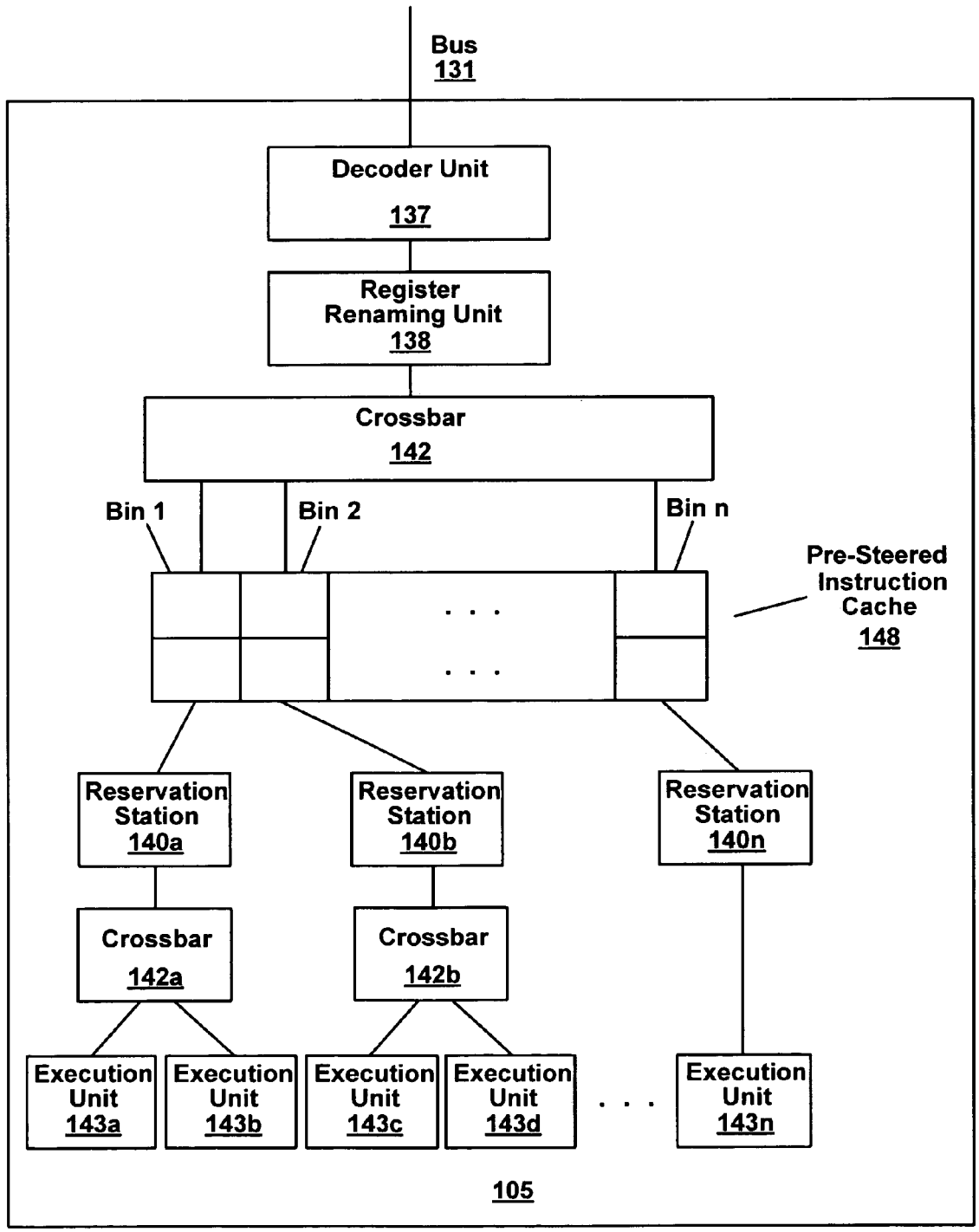
FIG. 7 shows a block diagram of the processor according to a third embodiment of the present invention.

FIG. 7 shows a block diagram of processor 105 according to a third embodiment of the present invention. In this embodiment, each of the bins in pre-steered instruction cache 148 corresponds to clusters of execution units. The instructions are steered by crossbars at two different points: first, prior to pre-steered instruction cache 148, and second, prior to an appropriate individual execution unit. If, however, a cluster contains only one execution unit, then instructions destined for that execution unit do not need to be steered a second time because there is only one execution unit corresponding to that bin.

As an example, all the floating point instructions may be pre-steered to a particular bin in pre-steered instruction cache 148 corresponding to a cluster of floating point execution units. The cluster of floating point execution units may include a floating point adder execution unit, a floating point multiplier execution unit, and a floating point divider execution unit. After the instructions leave pre-steered instruction cache 148, they may need to be steered a second time (the second steering may also be performed by crossbars) to the correct individual execution unit. In the example, a floating point multiply instruction should be steered a second time from the particular bin to the floating point multiply execution unit.

In FIG. 7, each bin of pre-steered instruction cache 148 corresponds to a cluster of execution units. For example, bin 1 of pre-steered instruction cache 148 corresponds to execution unit 143a and execution unit 143b. Bin 2 corresponds to execution unit 143c and execution unit 143d. The last bin within pre-steered instruction cache 148, designated as bin n, corresponds to the last cluster of execution units, which in FIG. 7 is represented by execution unit 143n.

Referring to FIG. 7, in the third embodiment, instructions are initially fetched from one of the memory devices into decoder unit 137 which decodes the instructions. The instruction are then sent to register renaming unit 138 which renames the registers in order remove false data dependencies. The instructions are then sent to crossbar 142 which steers each of the instructions into an appropriate bin within pre-steered instruction cache 148 that corresponds to the cluster of execution units that the particular instruction requires.

Each of the bins within pre-steered instruction cache 148 has a corresponding reservation station. In FIG. 7, a reservation station 140a corresponds to bin 1, a reservation station 140b corresponds to bin 2, and a last reservation station, designated as reservation station 140n, corresponds to a last bin, designated as bin n.

Each of the reservations stations has a corresponding crossbar. Crossbars are used to steer each of the instructions to an individual execution unit that the particular instruction requires. In FIG. 6, crossbar 142a is used to steer instructions to either an execution unit 143a or an execution unit 143b. Crossbar 142b is used to steer an instruction to either an execution unit 143c or an execution unit 143d. A last execution unit, designated as execution unit 143n, does not require a crossbar because there is only one execution unit in the cluster. Therefore, execution unit 143n is connected directly to reservation station 140n. In this embodiment, even though crossbars are still used, the size of each of the crossbars is greatly reduced because the instructions are steered the second time between a fewer number of execution units (i.e., the instructions are only steered between the execution units in the cluster). Since the wires needed in a crossbar increases as the number of execution units to which the crossbar steers increases, storing instructions in the pre-steered instruction cache 148 that are partially pre-steered reduces the size of the crossbar and thus reduces the timing delays caused by resistance and capacitance.

Figure 8:
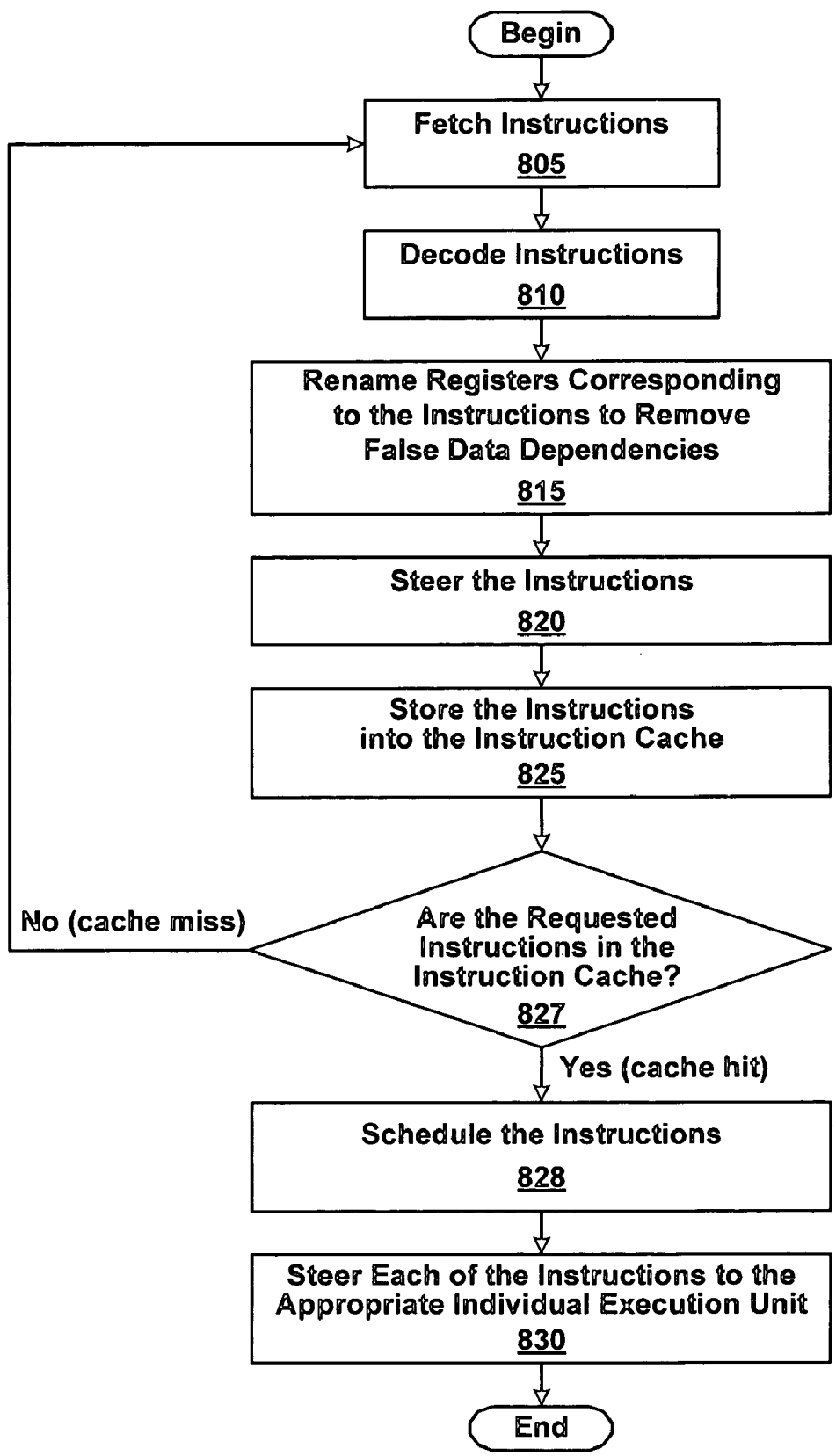
FIG. 8 shows a flowchart describing the process of executing instructions according to the third embodiment of the present invention.

FIG. 8 shows a flowchart describing the process of executing instructions according to the third embodiment of the present invention. In step 805, instructions are fetched from a memory device and sent to decoder unit 137. In step 810, decoder unit 137 decodes each of the instructions. The instructions are then transferred to register renaming unit 138. In step 815, register renaming unit 138 renames the registers of a particular instruction to remove false data dependencies. The instructions are then sent to crossbar 142. In step 820, crossbar 142 steers each of the instructions into one of the bins in pre-steered instruction cache 148 corresponding to the cluster of execution units that the particular instruction requires. In step 825, the instructions are stored in pre-steered instruction cache 148. Each of the instructions are stored into the appropriate bin of pre-steered instruction cache 148, i.e., stored into the bin corresponding to the cluster of execution units that the instruction requires.

In step 827, processor 105 determines if the instructions requested by the processor are in pre-steered instruction cache 148. If the requested instructions are not in pre-steered instruction cache 148 (i.e., a cache miss occurred), then control returns to step 805 in order to fetch the requested instructions not in pre-steered instruction cache 148 from one of the memory devices. If the requested instructions are in pre-steered instruction cache 148, then those instructions are fetched from pre-steered instruction cache 148 and sent to the corresponding reservation stations. In step 828, the corresponding reservation stations schedule the instructions and send them to the corresponding crossbars. If a particular cluster only contains one execution unit, then the corresponding reservation station sends instructions requiring that cluster directly to that execution unit. In step 830, each of the corresponding crossbars steers each of the corresponding instructions to the individual execution unit in the particular execution unit cluster that the instruction requires.

Figure 9:
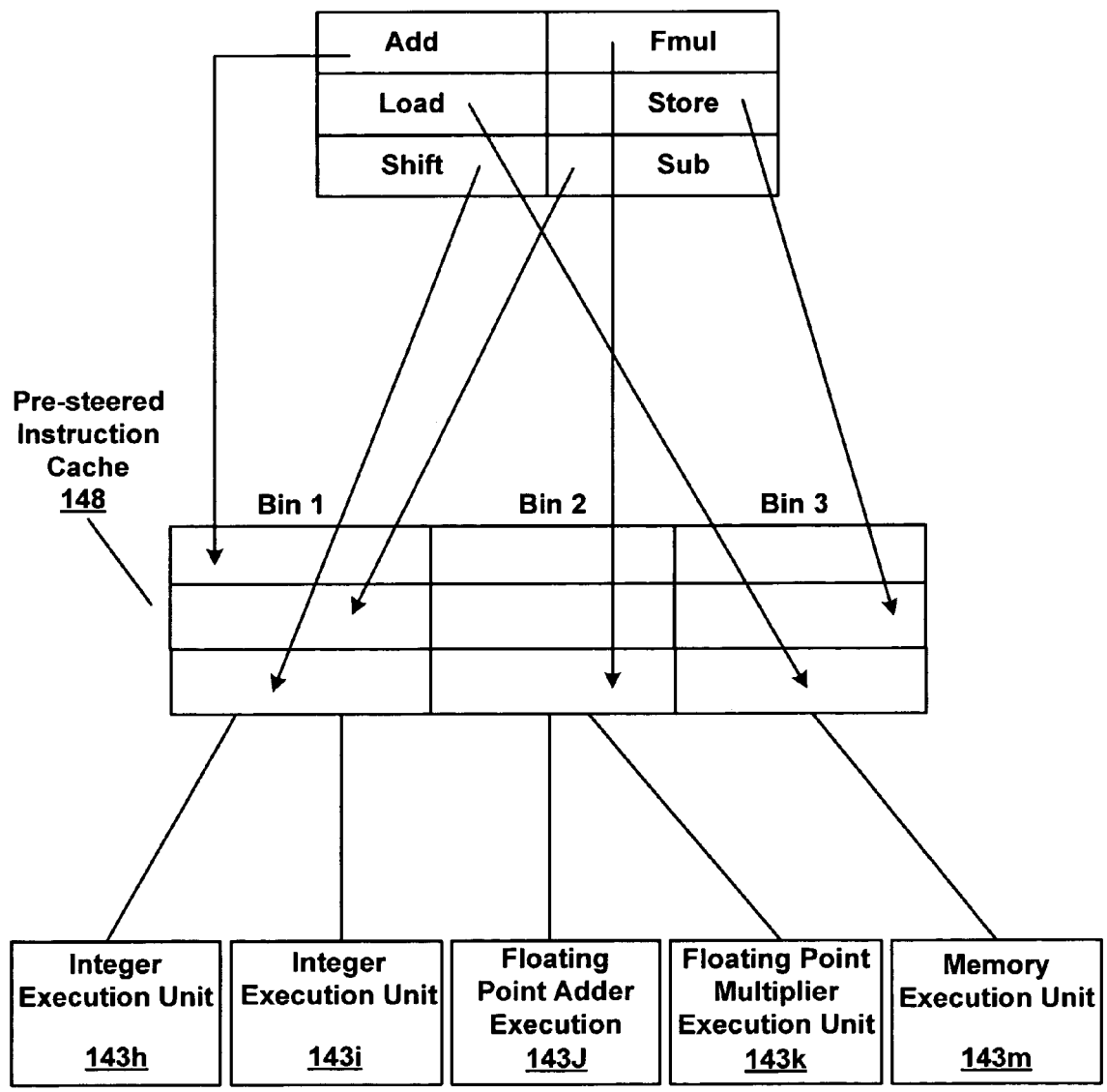
FIG. 9 illustrates the instruction steering activity in the third embodiment of the present invention.

FIG. 9 illustrates the instruction steering activity in the third embodiment of the present invention. In FIG. 9, bin 1 of pre-steered instruction cache 148 corresponds to a cluster of integer execution units, i.e., an integer execution unit 143h and an integer execution unit 143i. Bin 2 corresponds to a cluster of floating point execution units, i.e., floating point adder execution unit 143*j* and floating point multiplier execution unit 143*k*. Bin 3 corresponds to memory execution unit 143*m*. The instructions are first steered prior to pre-steered instruction cache 148. For the first steering, the "shift" instruction which uses an integer execution unit is steered to bin 1 which corresponds to the cluster of integer execution units. The "sub" instruction also uses an integer execution unit and thus is also steered to bin 1. The "load" instruction uses a memory execution unit and thus is steered to bin 3 which corresponds to memory execution unit 143*m*. The "store" instruction also requires a memory execution unit and thus is also steered to bin 3. The "add" instruction uses an integer execution unit and thus is steered to bin 1 which corresponds to the cluster of integer execution units. The "fmul" instruction uses a floating point execution unit and thus is steered to bin 2 which corresponds to the cluster of floating point execution units.

For the second steering, each of the instructions residing in the bins of pre-steered instruction cache 148 are steered by a crossbar to the individual execution unit that the instruction requires. For bin 1, a corresponding crossbar steers the instructions in that bin (i.e., the "shift" instruction, the "sub" instruction, and the "add" instruction) to either integer execution unit 143*h* or integer execution unit 143*i* based on the requirements of the instruction and the availability of the execution units. For bin 2, a corresponding crossbar would steer the "fmul" instruction to floating point multiplier execution unit 143*k*. For bin 3, the instructions in that bin (i.e., the "load" instruction and the "store" instruction) would be sent directly to memory execution unit 143*m*.

In a fourth embodiment, the bins of pre-steered instruction cache 148 may be overlapped. The overlapping may be between bins that are unlikely to be concurrently used. For example, if a bin corresponding to an integer execution unit is not likely to be used at the same time as a bin corresponding to a floating point execution unit, then those two bins may be overlapped such that in one case, both bins store instructions which require integer execution units.

Although embodiments are specifically illustrated and described herein, it will be appreciated that modifications and variations of the present invention are covered by the above teachings and within the purview of the appended claims without departing from the spirit and intended scope of the invention.

What is claimed is:

1. A method for executing a set of instructions in a processor, comprising:
    decoding the set of instructions;
    renaming a set of registers of a particular one of the set of instructions;
    steering each decoded instruction of the set of instructions into an instruction cache so as to store each of said decoded instructions at a location in said instruction cache based on a particular one of a set of execution units that the decoded instruction requires; and
    issuing each of the set of instructions from said instruction cache to a particular one of said set of execution units.

2. The method of claim 1 further comprising storing each of the set of instructions into a particular one of a set of bins in the instruction cache that corresponds to the particular one of the set of execution units that the instruction requires.

3. The method of claim 1 further comprising fetching a particular one of the set of instructions from a memory device if the particular one of the set of instructions is not found in the instruction cache.

4. The method of claim 1 further comprising scheduling a particular one of the set of instructions if the particular one of the set of instructions is found in the instruction cache.

5. The method of claim 4 further comprising executing the particular one of the set of instructions that is scheduled, using the particular one of the set of execution units that the particular one of the set of instructions requires.

6. A method for executing a set of instructions in a processor, comprising:
    decoding the set of instructions;
    renaming a set of registers of a particular one of the set of instructions;
    scheduling the set of instructions to avoid pipeline stalls; and
    steering each of the set of instructions into an instruction cache so as to store each of said instructions at a location in said instruction cache based on a particular one of a set of execution units that the instruction requires after the scheduling operation.

7. The method of claim 6 further comprising fetching a particular one of the set of instructions from a memory device if the particular one of the set of instructions is not found in the instruction cache.

8. The method of claim 6 further comprising storing each of the set of instructions into a particular one of a set of bins in the instruction cache that corresponds to the particular one of the set of execution units that the instruction requires.

9. The method of claim 6 further comprising executing the particular one of the set of instructions, using the particular one of the set of execution units that the instruction requires, if the particular one of the set of instructions is found in the instruction cache.

10. A method for executing a set of instructions in a processor, comprising:
    decoding the set of instructions;
    renaming a set of registers of a particular one of the set of instructions;
    steering at a first time each of the set of instructions into an instruction cache so as to store each of said instructions at a location in said instruction cache based on a particular one of a set of execution unit clusters that the instruction requires; and
    issuing each of the set of instructions from said instruction cache to a particular one of said set of execution unit clusters.

11. The method of claim 10 further comprising storing each of the set of instructions into a particular one of a set of bins in the instruction cache that corresponds to the particular one of the set of execution unit clusters that the instruction requires.

12. The method of claim 10 further comprising scheduling a particular one of the set of instructions if the particular one of the set of instructions is found in the instruction cache.

13. The method of claim 12 further comprising steering, at a second time, the particular one of the set of instructions that is scheduled into one of a set of execution units, within the particular one of the set of execution unit clusters, that the instruction requires.

14. The method of claim 13 further comprising executing the particular one of the set of instructions that is steered the second time, using the one of the set of execution units that the particular one of the set of instructions requires.

15. The method of claim 10 further comprising fetching a particular one of the set of instructions from a memory device if the particular one of the set of instructions is not found in the instruction cache.

16. A processor, comprising:

an instruction cache;

a crossbar to receive instructions from a memory device and coupled to the instruction cache to steer each of a set of instructions into the instruction cache so as to store each of said instructions at a location in said instruction cache based on a particular one of a set of execution units that the instruction requires, wherein each of the set of instructions are to be issued from said instruction cache to a particular one of said set of execution units; and a register renaming unit coupled to the crossbar, to eliminate false data dependencies.

17. The processor of claim 16 wherein the instruction cache includes a set of bins, each of the set of bins corresponding to a particular one of a set of execution units that a particular one of the set of instructions requires.

18. The processor of claim 16 further comprising a set of reservation stations, each of the set of reservation stations coupled to a corresponding one of the set of bins in the instruction cache, to schedule the set of instructions to avoid pipeline stalls.

19. The processor of claim 16 further comprising a reservation station, coupled to the register renaming unit, to schedule the set of instructions to avoid pipeline stalls.

20. A processor, comprising:

an instruction cache;

a first crossbar to receive instructions from a memory device coupled to the instruction cache to steer each of a set of instructions into the instruction cache so as to store each of said instructions at a location in said instruction cache based on a particular one of a set of execution unit clusters that the instruction requires, wherein each of the set of instructions are to be issued from said instruction cache to a particular one of said set of execution unit clusters; and a register renaming unit, coupled to the first crossbar, to eliminate false data dependencies.

21. The processor of claim 20 wherein the instruction cache includes a set of bins, each of the set of bins corresponding to a particular one of a set of execution unit clusters that a particular one of the set of instructions requires.

22. The processor of claim 20 further comprising a set of reservation stations, each of the set of reservation stations coupled to a corresponding one of the set of bins in the instruction cache, to schedule the set of instructions to avoid pipeline stalls.

23. The processor of claim 22 further comprising a set of second crossbars, each of the set of second crossbars coupled to a corresponding one of the set of reservation stations, to steer, at a second time, each of the set of instructions to a particular one of a set of execution units, within the particular one of the set of execution unit clusters, that the instruction requires.

24. A system, comprising:

a memory device to store a plurality of instructions;

a processor including an instruction cache;

a crossbar to receive instructions from the memory device and coupled to the instruction cache to steer each of a set of instructions into the instruction cache so as to store each of said instructions at a location in said instruction cache based on a particular one of a set of execution units that the instruction requires, wherein each of the set of instructions are to be issued from said instruction cache to a particular one of said set of execution units; and a register renaming unit coupled to the crossbar, to eliminate false data dependencies.

25. The system of claim 24 wherein the instruction cache includes a set of bins, each of the set of bins corresponding to a particular one of a set of execution units that a particular one of the set of instructions requires.

26. The system of claim 24 wherein said processor further includes a set of reservation stations, each of the set of reservation stations coupled to a corresponding one of the set of bins in the instruction cache, to schedule the set of instructions to avoid pipeline stalls.

27. The system of claim 24 further comprising a reservation station, coupled to the register renaming unit, to schedule the set of instructions to avoid pipeline stalls.

28. A system, comprising:

a memory device to store a plurality of instructions;

a processor including an instruction cache;

a first crossbar to receive instructions from a memory device coupled to the instruction cache to steer each of a set of instructions into the instruction cache so as to store each of said instructions at a location in said instruction cache based on a particular one of a set of execution unit clusters that the instruction requires, wherein each of the set of instructions are to be issued from said instruction cache to a particular one of said set of execution unit clusters;

a register renaming unit, coupled to the first crossbar, to eliminate false data dependencies.

29. The system of claim 28 wherein the instruction cache includes a set of bins, each of the set of bins corresponding to a particular one of a set of execution unit clusters that a particular one of the set of instructions requires.

30. The system of claim 28 wherein the processor further includes a set of reservation stations, each of the set of reservation stations coupled to a corresponding one of the set of bins in the instruction cache, to schedule the set of instructions to avoid pipeline stalls.

31. The system of claim 28 wherein the processor further includes a set of second crossbars, each of the set of second crossbars coupled to a corresponding one of the set of reservation stations, to steer, at a second time, each of the set of instructions to a particular one of a set of execution units, within the particular one of the set of execution unit clusters, that the instruction requires.

* * * * *

UNITED STATES PATENT AND TRADEMARK OFFICE
CERTIFICATE OF CORRECTION

| | | |
|---|---|---|
| PATENT NO. | : 6,944,750 B1 | Page 1 of 1 |
| APPLICATION NO. | : 09/540432 | |
| DATED | : September 13, 2005 | |
| INVENTOR(S) | : Gad S. Sheaffer | |

It is certified that error appears in the above-identified patent and that said Letters Patent is hereby corrected as shown below:

Column 10, Line 58 "unit cluster, that" should be --unit cluster that--

Column 11, Line 37 "the set of instructions are" should be --the set of instructions is--

Column 12, Line 11 "the set of instructions are" should be --the set of instructions is--

Column 12, Line 38 "the set of instructions are" should be --the set of instructions is--

Signed and Sealed this

Twenty-first Day of November, 2006

JON W. DUDAS
*Director of the United States Patent and Trademark Office*